US012573419B1

(12) United States Patent

Mammei et al.

(10) Patent No.: US 12,573,419 B1

(45) Date of Patent: Mar. 10, 2026

(54) SELECTABLE CURRENT BOOSTER CIRCUIT

(71) Applicant: STMicroelectronics International N.V., Geneva (CH)

(72) Inventors: Enrico Mammei, Milan (IT); Davide Morello, Milan (IT); Matteo Alessio Traldi, Milan (IT)

( * ) Notice: Subject to any disclaimer, the term of this patent is extended or adjusted under 35 U.S.C. 154(b) by 0 days.

(21) Appl. No.: 19/020,090

(22) Filed: Jan. 14, 2025

(51) Int. Cl.
<br>*G11B 20/10* (2006.01)
<br>*G11B 5/012* (2006.01)
<br>*G11B 5/02* (2006.01)
<br>*G11B 5/00* (2006.01)

(52) U.S. Cl.
<br>CPC .............. *G11B 5/022* (2013.01); *G11B 5/012* (2013.01); *G11B 2005/0018* (2013.01)

(58) Field of Classification Search
<br>CPC ....... G11B 5/09; G11B 20/10; G11B 20/0013; G11B 5/00; G11B 20/08; G11B 5/035; G11B 20/10027; G11B 5/02
<br>USPC ..................................................... 360/46, 67
<br>See application file for complete search history.

(56) References Cited

U.S. PATENT DOCUMENTS

| | | | |
|---|---|---|---|
| 6,366,421 B2 | 4/2002 | Teterud | |
| 6,794,880 B2 * | 9/2004 | Tucker ................... | G11B 5/455 |
| | | | 324/210 |
| 7,848,038 B1 | 12/2010 | Tan | |
| 2005/0117244 A1 | 6/2005 | Ranmuthu | |
| 2009/0153991 A1 | 6/2009 | Escobar-Bowser | |
| 2012/0019947 A1 | 1/2012 | Kuehlwein | |

* cited by examiner

*Primary Examiner* — Nabil Z Hindi

(74) *Attorney, Agent, or Firm* — Slater Matsil, LLP

(57) ABSTRACT

According to an embodiment, a circuit for reducing current transition times includes a pre-biased first transistor, a second transistor, and a binary-weighted capacitor network with selectively activated capacitors controlled by logic gates receiving a command signal and boost selection signals. A resistor between the transistors provides a voltage restoration path. Another embodiment includes a binary-weighted resistor network with parallel resistor paths and switches. A write driver system incorporates the boost circuits, arranged in diagonal pairs across a bridge circuit. A control circuit activates the diagonal boost circuit pairs during switching transitions of the bridge circuit, generating current pulses that combine with the main bridge current to reduce transition times at a magnetic recording head while maintaining impedance matching. The boost circuits enable programmable current levels and sub-nanosecond pulse durations without complex timing circuitry, enhancing write performance in magnetic recording systems.

20 Claims, 8 Drawing Sheets

SELECTABLE CURRENT BOOSTER CIRCUIT

TECHNICAL FIELD

The present disclosure generally relates to electronic devices and, in particular embodiments, to a selectable current booster circuit.

BACKGROUND

Magnetic recording systems store digital information by manipulating magnetic domains on storage media. Hard disk drives represent a common implementation of magnetic recording, where rotating disks coated with magnetic materials serve as the storage medium. The process involves converting electrical signals into magnetic fields to write data onto the magnetic storage medium.

In hard disk drives, a magnetic recording head contains electromagnetic components that generate localized magnetic fields. These magnetic fields alter the magnetization of microscopic regions on the disk surface, effectively storing binary data. The direction of the magnetic fields determines the recorded data states.

Write driver systems provide precisely controlled electrical currents to the magnetic recording head through transmission lines. These transmission lines carry high-frequency signals while maintaining signal integrity through proper impedance matching. The electrical characteristics of transmission lines influence how signals propagate from write drivers to the recording head.

Modern hard disk drives operate at increasingly higher data rates to improve storage performance. Higher data rates correspond to shorter periods for writing each bit of data onto the disk. The magnetic recording process requires rapid changes in write current direction to record data at these higher rates.

Signal propagation in high-speed circuits involves various electrical phenomena. Parasitic capacitances and inductances exist throughout signal paths in electronic systems. These parasitic elements can affect high-frequency signal behavior. Transmission line effects become more pronounced as signal frequencies increase.

Magnetic recording systems continue evolving toward higher areal densities and faster data rates. These advances drive requirements across the recording channel, from electronic circuits to magnetic components. Signal integrity, timing precision, and electromagnetic interactions can all play important roles in magnetic recording performance.

SUMMARY

Technical advantages are generally achieved by embodiments of this disclosure, which describe a selectable current booster circuit.

A first aspect relates to a circuit, comprising a first transistor having a pre-biased base terminal; a second transistor; a first capacitor coupled to the first transistor; a binary-weighted capacitor network comprising a plurality of selectively activated capacitors; a plurality of logic gates coupled to the binary-weighted capacitor network, wherein each logic gate is configured to receive a command signal and a corresponding boost selection signal; and a first resistor coupled between the first transistor and the second transistor, wherein the first resistor provides a voltage restoration path.

A second aspect relates to a circuit, comprising a first transistor having a pre-biased base terminal; a second transistor; a binary-weighted resistor network comprising a plurality of parallel resistor paths; a plurality of switches, each switch coupled in series with a corresponding resistor path and configured to receive a boost selection signal; a first switch coupled to receive a command signal; and a first resistor coupled between the first transistor and the second transistor, wherein the first resistor provides a voltage restoration path.

A third aspect relates to a write driver system, comprising a bridge circuit including first and second branches, each branch having upper and lower sides; a first positive boost circuit coupled in parallel with the upper side of the first branch; a first negative boost circuit coupled in parallel with the lower side of the second branch; a second negative boost circuit coupled in parallel with the lower side of the first branch; a second positive boost circuit coupled in parallel with the upper side of the second branch; and a control circuit configured to activate diagonal pairs of boost circuits during switching transitions of the bridge circuit.

Embodiments can be implemented in hardware, software, or any combination thereof.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

Figure 1:
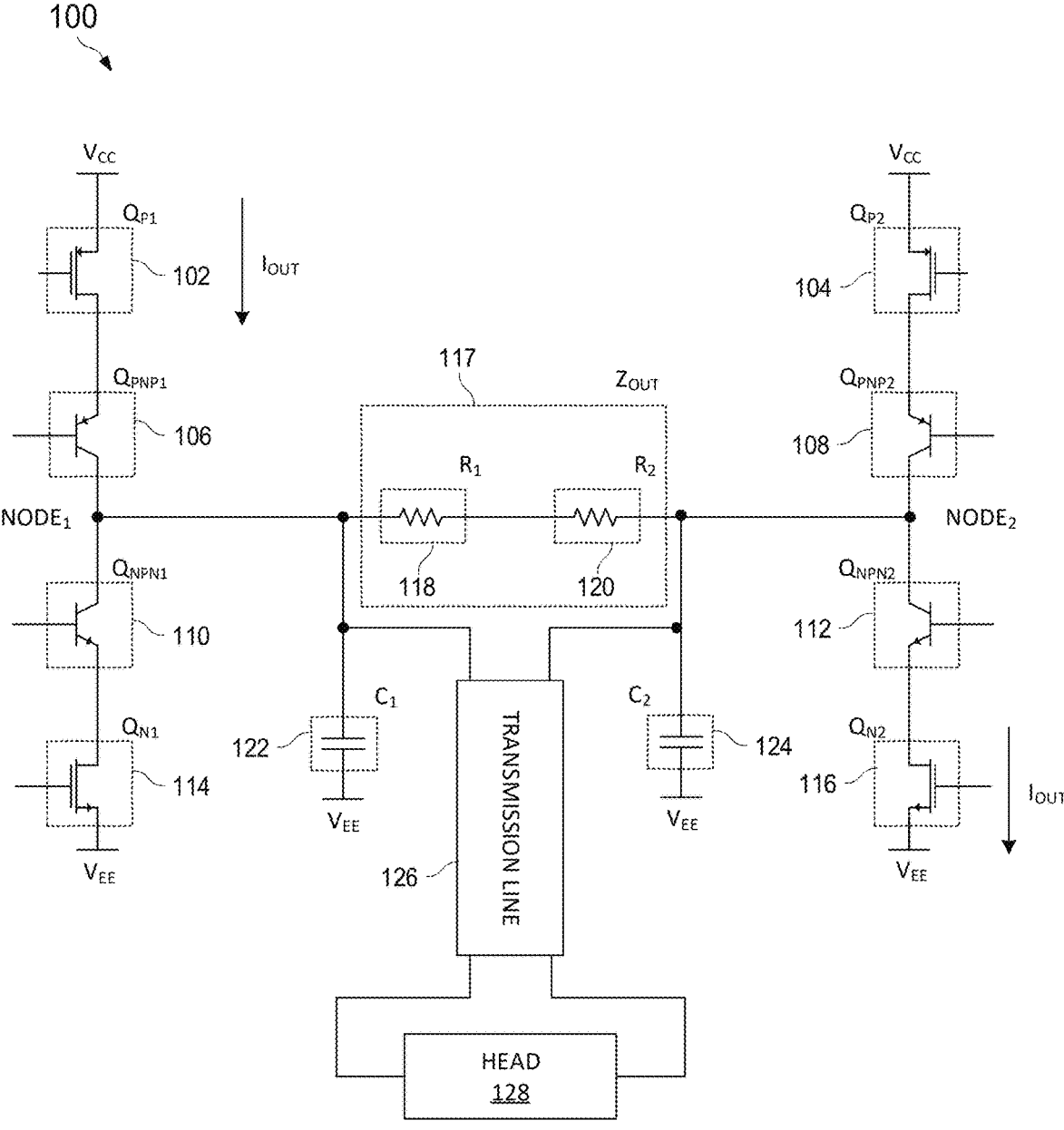
FIG. 1 is a schematic of a write driver system implemented in a hard disk drive (HDD) preamplifier system.

This disclosure provides many applicable inventive concepts that can be embodied in a wide variety of specific contexts. The particular embodiments are merely illustrative of specific configurations and do not limit the scope of the claimed embodiments. Features from different embodiments may be combined to form further embodiments unless noted otherwise. Various embodiments are illustrated in the accompanying drawing figures, where identical components and elements are identified by the same reference number, and repetitive descriptions are omitted for brevity.

Variations or modifications described in one of the embodiments may also apply to others. Further, various changes, substitutions, and alterations can be made herein without departing from the spirit and scope of this disclosure as defined by the appended claims.

While the inventive aspects are described primarily in the context of hard disk drive preamplifier circuits, it should also be appreciated that these inventive aspects may also apply to any high-speed electronic systems requiring precise current control and fast transition times. In particular, aspects of this disclosure may similarly apply to RF circuits, high-speed data transmission systems, motor control circuits, and other applications where high-frequency signals with associated short-rise times are required. The disclosed current boosting techniques can be particularly beneficial in applications requiring rapid current switching with controlled transition times.

In embodiments, a current driver system includes a bridge circuit that provides write currents through a transmission line to a magnetic recording head. The bridge circuit includes first and second branches that operate diagonally to generate bi-directional write currents. Current boosting capabilities integrated with the bridge circuit reduce current transition times while maintaining impedance-matching characteristics.

Aspect of the disclosure, incorporates multiple boost circuits positioned around the bridge circuit. A first P-boost circuit couples in parallel with an upper side of the first branch while a first N-boost circuit couples in parallel with a lower side of the second branch. A second N-boost circuit couples in parallel with a lower side of the first branch, and a second P-boost circuit couples in parallel with an upper side of the second branch. Each boost circuit generates short-duration current pulses that combine with the main bridge current to reduce transition time.

In embodiments, the boost circuits employ selectable current levels through, for example, capacitive or resistive implementations. In capacitive implementations, binary-weighted boost capacitors couple to pre-biased transistors to generate controllable current pulses. In some embodiments, binary-weighted resistors with voltage selection achieve similar programmable boost currents. The boost circuits generate pulses within 70 picoseconds or less compared to the main bridge current transitions of 180-200 picoseconds or greater.

In embodiments, a control circuit coordinates the diagonal activation of boost circuits during bridge switching phases. During a first phase, the control circuit simultaneously activates the first P-boost circuit and first N-boost circuit. During a second phase, the second N-boost and second P-boost circuits activate simultaneously. This diagonal activation pattern maintains a balanced current flow while reducing transition times.

In embodiments, the boost circuit configurations allow selection between multiple discrete boost current levels. The capacitive implementation uses selectable parallel capacitors, while the resistive implementation employs selectable parallel resistors with voltage selection. Both approaches provide programmable boost currents that can be optimized for specific applications. The boost circuits contribute minimal parasitic capacitance, allowing the system to maintain proper impedance-matching characteristics.

The current boosting techniques described herein provide several advantages over conventional solutions. The addition of coordinated boost circuits significantly reduces current transition times, achieving considerably faster rise times (e.g., approximately 65 picoseconds) compared to conventional rise times exceeding, for example, 90 picoseconds. Further, the selectable pre-emphasis levels, implemented through either binary-weighted capacitor networks or binary-weighted resistor networks, enable precise adjustment of the boost current magnitude. This programmable nature optimizes the current boosting effect for different operating conditions and application requirements while maintaining reduced transition times. These and additional details are further discussed below.

FIG. 1 illustrates a schematic of a write driver system 100 implemented in a hard disk drive (HDD) preamplifier system. The write driver system 100 includes a full bridge configuration with a first branch and a second branch that provides bidirectional write currents. The first branch includes a first p-channel transistor ($Q_{P1}$) 102, a first PNP transistor ($Q_{PNP1}$) 106, a first NPN transistor ($Q_{NPN1}$) 110, and a first n-channel transistor ($Q_{N1}$) 114. The second branch includes a second p-channel transistor ($Q_{P2}$) 104, a second PNP transistor ($Q_{PNP2}$) 108, a second NPN transistor ($Q_{NPN2}$) 112, and a second n-channel transistor ($Q_{N2}$) 116.

The write driver system 100 implements an NPN-PNP H-bridge configuration where each branch includes complementary bipolar transistors. In the first branch, the first PNP transistor ($Q_{PNP1}$) 106 couples between the first p-channel transistor ($Q_{P1}$) 102 and the first NPN transistor ($Q_{NPN1}$) 110, which in turn couples to the first n-channel transistor ($Q_{N1}$) 114.

Similarly, in the second branch, the second PNP transistor ($Q_{PNP2}$) 108 couples between the second p-channel transistor ($Q_{P2}$) 104 and the second NPN transistor ($Q_{NPN2}$) 112, which couples to the second n-channel transistor ($Q_{N2}$) 116. The H-bridge configuration enables bidirectional current flow through the magnetic recording head 128 by activating diagonal pairs of transistors.

The bridge circuit provides output current ($I_{OUT}$) through an impedance matching network ($Z_{OUT}$) 117 to a transmission line 126. The impedance matching network ($Z_{OUT}$) 117 includes a first resistor ($R_1$) 118 and a second resistor ($R_2$) 120 that match the characteristic impedance of the transmission line 126. The first parasitic capacitance ($C_1$) 122 and the second parasitic capacitance ($C_2$) 124 exist at the interface between the bridge circuit and the transmission line 126. The transmission line 126 couples the bridge circuit to a magnetic recording head 128.

The first node ($NODE_1$) is a common node between the first PNP transistor ($Q_{PNP1}$) 106, the first NPN transistor ($Q_{NPN1}$) 110, the impedance matching network ($Z_{OUT}$) 117, the first parasitic capacitance ($C_1$) 122, and the transmission line 126. The second node ($NODE_2$) is a common node between the second PNP transistor ($Q_{PNP2}$) 108, the second NPN transistor ($Q_{NPN2}$) 112, the impedance matching network ($Z_{OUT}$) 117, the second parasitic capacitance ($C_2$) 124, and the transmission line 126.

In various embodiments, the impedance matching considerations are similar to RF matching techniques but with the important distinction of requiring broadband matching across a wide frequency range from DC to several gigahertz. Unlike narrow-band RF applications, the write driver system operates over a complete bandwidth to support the fast current transitions required for high-speed data writing.

The write driver system 100 provides precisely controlled bidirectional write currents to the magnetic recording head 128 for writing data onto a magnetic storage medium. The H-bridge configuration enables switching of current direction through the magnetic recording head 128 by alternately activating diagonal pairs of transistors in the first and second branches.

When transistors in one diagonal pair activate, current flows through the magnetic recording head 128 in a first direction to generate a magnetic field of a first polarity. When transistors in the opposite diagonal pair activate, current flows through the magnetic recording head 128 in the opposite direction to generate a magnetic field of opposite polarity.

The alternating magnetic fields create different magnetic orientations on the storage medium, thereby encoding binary data. The impedance matching network ($Z_{OUT}$) 117 ensures proper signal transmission through the transmission line 126 by matching the bridge circuit output impedance to the transmission line's characteristic impedance while minimizing signal reflections that could distort the write current waveform at the magnetic recording head 128.

The bridge circuit switches current flow through diagonal pairs of transistors to generate bidirectional write currents through the magnetic recording head 128. The first parasitic capacitance (C1) 122 and second parasitic capacitance (C2) 124 represent the combined parasitic capacitances at the interface points, or pads, where the bridge circuit couples to the transmission line 126.

The parasitic capacitances typically range from a few picofarads to several picofarads and arise from various sources including pad metallization, protection circuits, and package parasitic. The parasitic capacitances act as low-pass filters that limit the bandwidth of the write current signal path. As the write current switches between directions through the magnetic recording head 128, the parasitic capacitances must charge and discharge, contributing to increased transition times and degraded write current waveform fidelity at the magnetic recording head 128.

The first parasitic capacitance ($C_1$) 122 and the second parasitic capacitance ($C_2$) 124, combined with bandwidth limitations of the transmission line 126, affect the timing of current transitions at the magnetic recording head 128. The parasitic elements and transmission line characteristics result in current transition times exceeding 70 picoseconds at the magnetic recording head 128.

Figure 2:
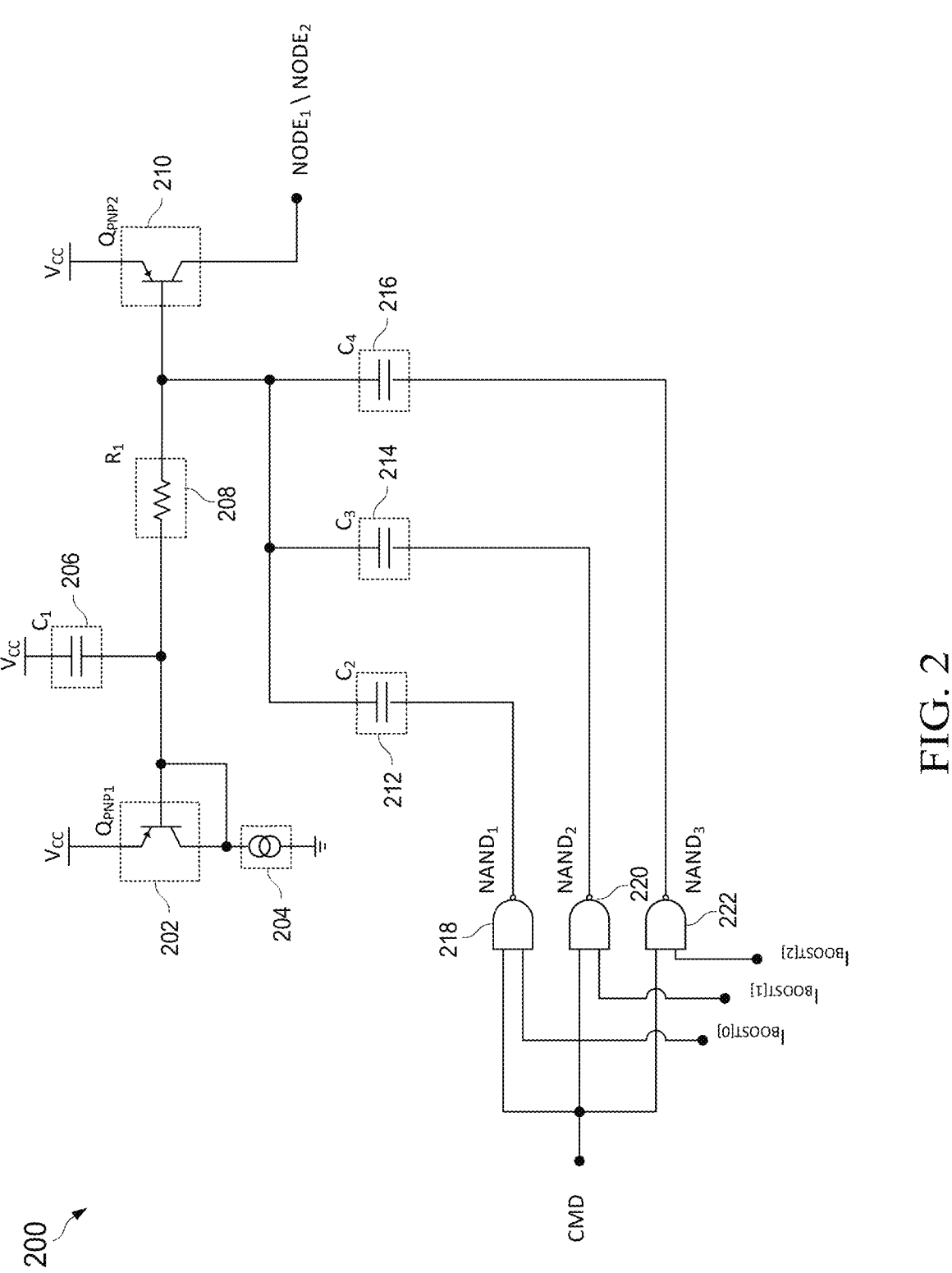
FIG. 2 is a schematic of an embodiment positive boost circuit.

FIG. 2 illustrates a schematic of an embodiment positive boost circuit 200, which can be coupled to the first node ($NODE_1$) and the second node ($NODE_2$) of the write driver system 100. The positive boost circuit 200 includes a first PNP transistor ($Q_{PNP1}$) 202, a source current 204, a first capacitor ($C_1$) 206, a first resistor ($R_1$) 208, a second PNP transistor ($Q_{PNP2}$) 210, a second capacitor ($C_2$) 212, a third capacitor ($C_3$) 214, a fourth capacitor ($C_4$) 216, a first NAND gate ($NAND_1$) 218, a second NAND gate ($NAND_2$) 220, and a third NAND gate ($NAND_3$) 222, which may (or may not) be arranged as shown. The positive boost circuit 200 may include additional components not shown.

The positive boost circuit 200 generates current pulses in parallel with the bridge circuit current ($I_{OUT}$) to reduce transition times. The first PNP transistor ($Q_{PNP1}$) 202 receives a pre-bias voltage through the source current 204, while the second PNP transistor ($Q_{PNP2}$) 210 couples to the first node ($NODE_1$) or the second node ($NODE_2$). The first resistor ($R_1$) 208 couples between the first PNP transistor ($Q_{PNP1}$) 202 and the second PNP transistor ($Q_{PNP2}$) 210, providing a path for the PNP base voltage to return to its initial value after activation. The first capacitor ($C_1$) 206 couples to the first PNP transistor ($Q_{PNP1}$) 202 to facilitate the voltage pulse generation by keeping the base of the first PNP transistor ($Q_{PNP1}$) 202 as stable as possible.

A binary-weighted capacitor network includes the second capacitor ($C_2$) 212, the third capacitor ($C_3$) 214, and the fourth capacitor ($C_4$) 216. These capacitors can be selectively activated through the NAND gate logic to provide eight different levels of boost current. The first NAND gate ($NAND_1$) 218, the second NAND gate ($NAND_2$) 220, and the third NAND gate ($NAND_3$) 222 receive a command signal (CMD) and boost selection signals ($I_{BOOST[0]}$, $I_{BOOST[1]}$, $_{BOOST[2]}$) to control the activation of the capacitor network.

In embodiments, the NAND gates selectively couple the binary-weighted capacitors to ground based on the boost selection signals. The second capacitor ($C_2$) 212, the third capacitor ($C_3$) 214, and the fourth capacitor ($C_4$) 216 may be sized in binary ratios (e.g., 1×, 2×, 4×) to provide linear steps in boost current magnitude when activated in different combinations.

In embodiments, the command signal (CMD) activates the positive boost circuit 200 in coordination with switching of the write driver system 100. The boost current pulse precedes and overlaps with the main bridge current transition to reduce the overall transition time at the magnetic recording head 128.

When the command signal (CMD) activates, the NAND gates drive selected capacitors based on the boost selection signals, creating a voltage pulse at the base of the second PNP transistor ($Q_{PNP2}$) 210. Due to the exponential behavior of the second PNP transistor ($Q_{PNP2}$) 210, a small change in base-emitter voltage ($V_{BE}$) generates a large collector current.

In embodiments, the resulting current pulse flows through the second PNP transistor ($Q_{PNP2}$) 210 to the first node ($NODE_1$) and the second node ($NODE_2$), providing additional current (e.g., 40 milliamps (mA)) for 70 picoseconds while the main bridge current transitions occur over 180 picoseconds.

After the brief pulse duration, the command signal (CMD) is deactivated, forcing the outputs of the NAND gates high. This pulls up the base of the second PNP transistor ($Q_{PNP2}$) 210 via the binary-weighted capacitor network, effectively terminating the boost current. The first resistor ($R_1$) 208 and the first capacitor ($C_1$) 206 form a lowpass filter that helps maintain a stable voltage at the base of the first PNP transistor ($Q_{PNP1}$) 202. The binary-weighted capacitor network allows precise control over the boost current magnitude by enabling different combinations of capacitors through the boost selection signals, providing eight discrete levels of boost current adjustment.

It should be appreciated that the binary-weighted capacitor network and associated NAND gate logic represent one example implementation for achieving multiple levels of boost current adjustment. In various embodiments, different circuits and configurations can be employed to provide selective boost current levels.

For example, the boost current adjustment may be implemented using weighted resistor networks, programmable current sources, or other switchable circuits that can provide multiple discrete levels of boost current control while maintaining the fast transition characteristics of the positive boost circuit 200.

Advantageously, the configuration of the positive boost circuit 200, with pre-biased PNP transistors and capacitive coupling, enables the generation of very short-duration current pulses without requiring complex timing circuits. The exponential current gain characteristic of the bipolar transistors allows the positive boost circuit 200 to generate substantial current pulses from small input voltage changes while maintaining controlled pulse durations.

Figure 3:
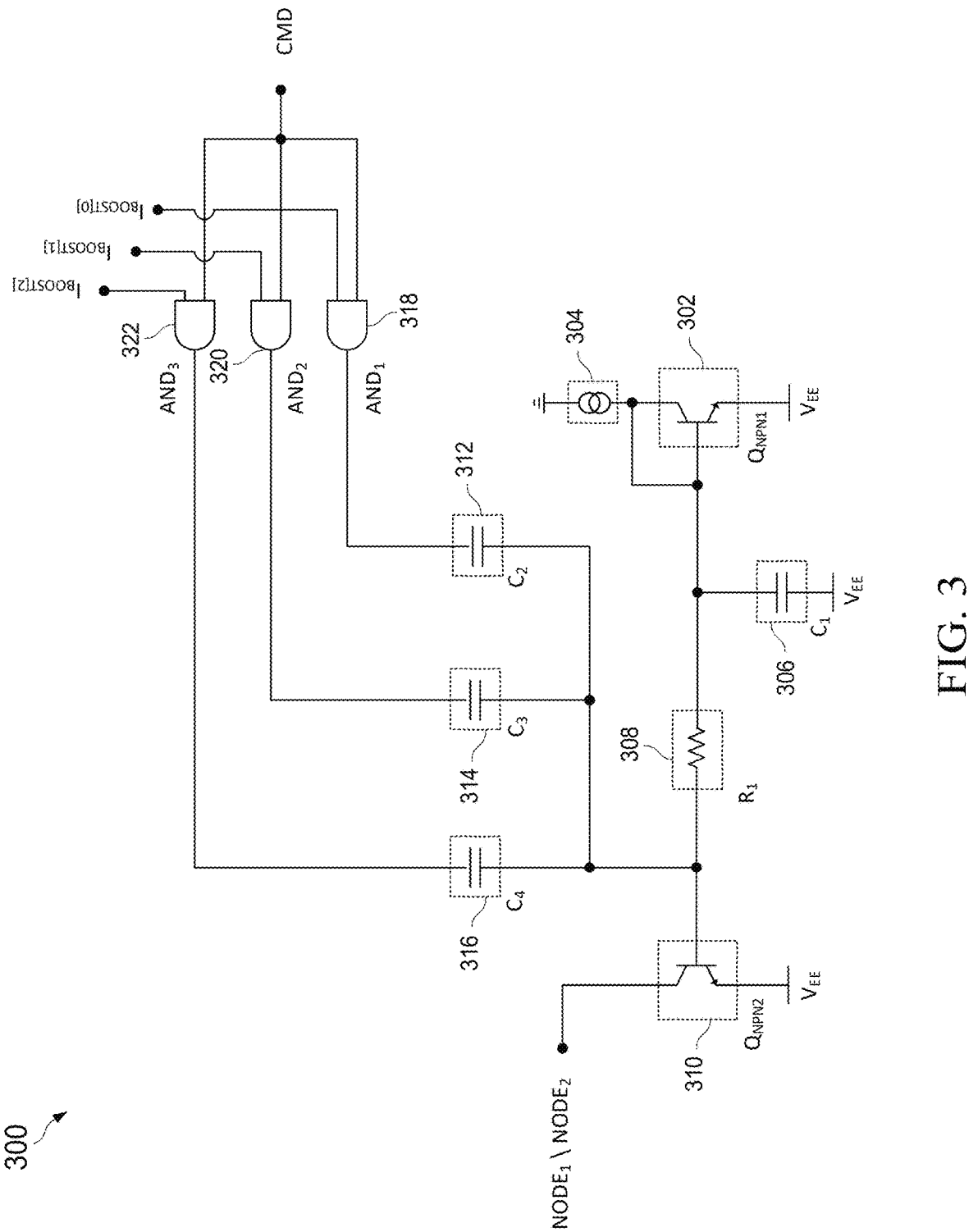
FIG. 3 is a schematic of an embodiment negative boost circuit.

FIG. 3 illustrates a schematic of an embodiment negative boost circuit 300, which can be coupled to the first node ($NODE_1$) or the second node ($NODE_2$) of the write driver system 100. The negative boost circuit 300 includes a first NPN transistor ($Q_{NPN1}$) 302, a source current 304, a first capacitor ($C_1$) 306, a first resistor ($R_1$) 308, a second NPN transistor ($Q_{NPN2}$) 310, a second capacitor ($C_2$) 312, a third capacitor ($C_3$) 314, a fourth capacitor ($C_4$) 316, a first AND gate ($AND_1$) 318, a second AND gate ($AND_2$) 320, and a third AND gate ($AND_3$) 322, which may (or may not) be arranged as shown. The negative boost circuit 300 may include additional components not shown.

The negative boost circuit 300 (and the positive boost circuit 200) generates current pulses in parallel with the bridge circuit current ($I_{OUT}$) to reduce transition times. The first NPN transistor ($Q_{NPN1}$) 302 receives a pre-bias voltage through the source current 304, while the second NPN transistor ($Q_{NPN2}$) 310 couples to the first node ($NODE_1$) or the second node ($NODE_2$). The first resistor ($R_1$) 308 couples between the first NPN transistor ($Q_{NPN1}$) 302 and the second NPN transistor ($Q_{NPN2}$) 310, providing a path for the NPN base voltage to return to its initial value after activation. The first capacitor ($C_1$) 306 couples to the first NPN transistor ($Q_{NPN1}$) 302 to facilitate the voltage pulse generation.

A binary-weighted capacitor network includes the second capacitor ($C_2$) 312, the third capacitor ($C_3$) 314, and the fourth capacitor ($C_4$) 316. These capacitors can be selectively activated through the AND gate logic to provide eight different levels of boost current. The first AND gate ($AND_1$) 318, the second AND gate ($AND_2$) 320, and the third AND gate ($AND_3$) 322 receive a command signal (CMD) and boost selection signals ($I_{BOOST[0]}$, $I_{BOOST[1]}$, $_{BOOST[2]}$) to control the activation of the capacitor network.

In embodiments, the AND gates selectively couple the binary-weighted capacitors to ground based on the boost selection signals. The second capacitor ($C_2$) 312, the third capacitor ($C_3$) 314, and the fourth capacitor ($C_4$) 316 may be sized in binary ratios (e.g., 1×, 2×, 4×) to provide linear steps in boost current magnitude when activated in different combinations.

In embodiments, the command signal (CMD) activates the negative boost circuit 300 in coordination with switching of the write driver system 100. The boost current pulse precedes and overlaps with the main bridge current transition to reduce the overall transition time at the magnetic recording head 128.

When the command signal (CMD) activates, the AND gates drive selected capacitors based on the boost selection signals, creating a voltage pulse at the base of the second NPN transistor ($Q_{NPN2}$) 310. Due to the exponential behavior of the second NPN transistor ($Q_{NPN2}$) 310, a small change in base-emitter voltage (VBE) generates a large collector current.

In embodiments, the resulting current pulse flows through the second NPN transistor ($Q_{NPN2}$) 310 to the first node ($NODE_1$) or the second node ($NODE_2$), providing additional current (e.g., 40 milliamps (mA)) for 70 picoseconds while the main bridge current transitions occur over 180 picoseconds.

After the brief pulse duration, the command signal (CMD) is deactivated, forcing the outputs of the AND gates to be logic high. This pulls down the base of the second NPN transistor ($Q_{PNP2}$) 310 via the binary-weighted capacitor network, effectively terminating the boost current. The first resistor ($R_1$) 308 and the first capacitor ($C_1$) 306 form a lowpass filter that helps maintain a stable voltage at the base of the first NPN transistor ($Q_{NPN1}$) 302. The binary-weighted capacitor network allows precise control over the boost current magnitude by enabling different combinations of capacitors through the boost selection signals, providing eight discrete levels of boost current adjustment.

It should be appreciated that the binary-weighted capacitor network and associated AND gate logic represent one example implementation for achieving multiple levels of boost current adjustment. In various embodiments, different circuits and configurations can be employed to provide selective boost current levels.

For example, the boost current adjustment may be implemented using weighted resistor networks, programmable current sources, or other switchable circuits that can provide multiple discrete levels of boost current control while maintaining the fast transition characteristics of the positive boost circuit 200.

Advantageously, the configuration of the negative boost circuit 300, with pre-biased NPN transistors and capacitive coupling, enables the generation of very short-duration current pulses without requiring complex timing circuits. The exponential current gain characteristic of the bipolar transistors allows the negative boost circuit 300 to generate substantial current pulses from small input voltage changes while maintaining controlled pulse durations.

Figure 4:
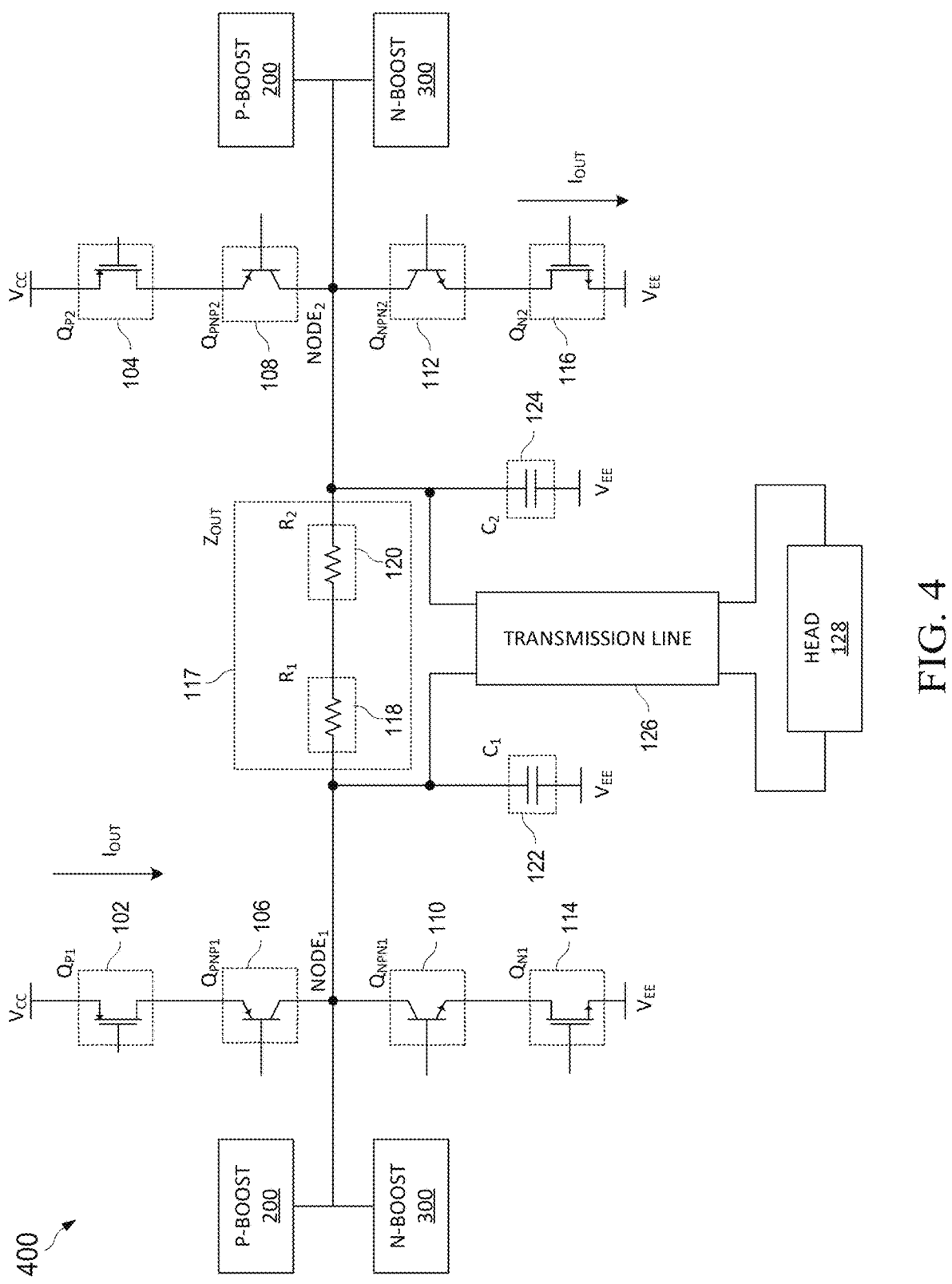
FIG. 4 is a schematic of an embodiment write driver system.

FIG. 4 illustrates a schematic of an embodiment write driver system 400 that combines the write driver system 100 with boost circuits for reducing current transition times. The write driver system 400 includes the full bridge configuration of the write driver system 100 with positive boost circuits 200 and negative boost circuits 300 coupled to the first node ($NODE_1$) or the second node ($NODE_2$) for enhancing current switching performance.

In the first branch, a first positive boost circuit 200 couples to the first node ($NODE_1$) between the first PNP transistor ($Q_{PNP1}$) 106 and the first NPN transistor ($Q_{NPN1}$) 110, while a first negative boost circuit 300 couples to the same node. Similarly, in the second branch, a second positive boost circuit 200 couples to the second node ($NODE_2$) between the second PNP transistor ($Q_{PNP2}$) 108 and the second NPN transistor ($Q_{NPN2}$) 112, with a second negative boost circuit 300 also coupled to the second node ($NODE_2$).

The boost circuits operate in diagonal pairs during bridge switching transitions. When the first branch conducts current from top to bottom, the first positive boost circuit 200 and the second negative boost circuit 300 activate simultaneously to provide additional current pulses that accelerate the transition. Conversely, when current flows through the opposite diagonal, the second positive boost circuit 200 and the first negative boost circuit 300 activate to enhance that transition.

Each boost circuit generates precisely controlled current pulses that combine with the main bridge current to reduce transition times at the magnetic recording head 128. The boost circuits maintain the impedance matching characteristics of the system while providing programmable boost current levels through their respective binary-weighted capacitor networks. This configuration enables faster write current transitions while preserving signal integrity through the transmission line 126 to the magnetic recording head 128.

In operation, the boost circuits generate current pulses (e.g., approximately 40 mA) for durations of 70 picoseconds, while the main bridge current transitions can occur over 180-200 picoseconds. The boost current pulses from the positive boost circuits 200 and negative boost circuits 300 are coordinated to precede and overlap with the main bridge current transitions, effectively reducing the overall transition time from, for example, approximately 90 picoseconds to 65 picoseconds at the magnetic recording head 128.

The complementary arrangement of positive boost circuits 200 and negative boost circuits 300 at each node provides balanced current enhancement during transitions. The configuration, combined with the programmable nature of the boost circuits, allows optimization of the boost currents based on specific application requirements without requiring modifications to the main bridge circuit or impedance matching elements. The parasitic capacitance contribution from the boost circuits remains negligible compared to the existing parasitic capacitances, thereby maintaining the intended impedance-matching characteristics of the system.

Figure 5:
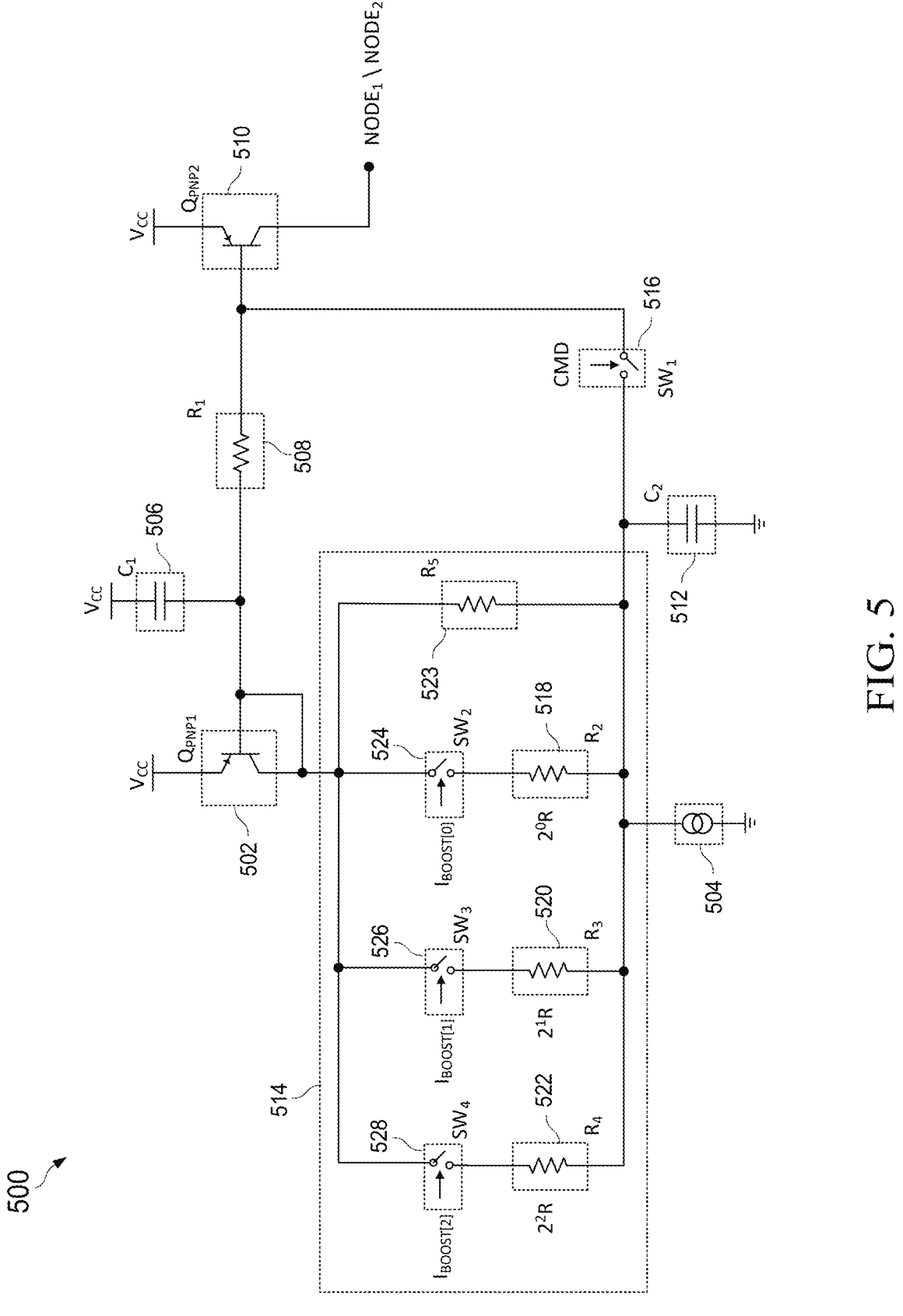
FIG. 5 is a schematic of an embodiment positive boost circuit.

FIG. 5 illustrates a schematic of an embodiment positive boost circuit 500, which can be coupled to the first node (NODE$_1$) or the second node (NODE$_2$) of the write driver system 100. The positive boost circuit 500 includes a first PNP transistor (Q$_{PNP1}$) 502, a source current 504, a first capacitor (C$_1$) 506, a first resistor (R$_1$) 508, a second PNP transistor (Q$_{PNP2}$) 510, a second capacitor (C$_2$) 512, a binary-weighted resistor network 514, a fifth resistor (R$_5$) 523, and a first switch (SW$_1$) 516, which may (or may not) be arranged as shown. The positive boost circuit 500 may include additional components not shown.

To reduce transition times, the positive boost circuit 500 generates current pulses in parallel with the bridge circuit current (I$_{OUT}$). The first PNP transistor (Q$_{PNP1}$) 502 receives a pre-bias voltage through the source current 504 and set by the binary-weighted resistor network 514, while the second PNP transistor (Q$_{PNP2}$) 510 couples to the first node (NODE$_1$) or the second node (NODE$_2$). The first resistor (R$_1$) 508 couples between the first PNP transistor (Q$_{PNP1}$) 502 and the second PNP transistor (Q$_{PNP2}$) 510, providing a path for the PNP base voltage to return to its initial value after activation. The first capacitor (C$_1$) 506 couples to the first PNP transistor (Q$_{PNP1}$) 502 to facilitate the voltage pulse generation.

In embodiments, the binary-weighted resistor network 514 includes a second resistor (R$_2$) 518, a third resistor (R$_3$) 520, a fourth resistor (R$_4$) 522, a second switch (SW$_2$) 524, and a third switch (SW$_3$) 526, and a fourth switch (SW$_4$) 528. The resistors are arranged in parallel, each in series with a corresponding switch. Each switch is coupled to a boost selection signal (i.e., I$_{BOOST[0]}$, I$_{BOOST[1]}$, $_{BOOST[2]}$). The source current 504 is coupled to the binary-weighted resistor network 514 to distribute current through the parallel resistor paths.

In embodiments, the source current 504 generates a stable reference current (I$_{REF}$) that flows through the active resistor paths based on the boost selection signals. The resistors of the binary-weighted resistor network 514 follow a binary-weighted progression where each subsequent resistor value doubles from the previous one. In an embodiment, the second resistor (R$_2$) 518 has a resistance value of R, the third resistor (R$_3$) 520 has a resistance value of 2R, and the fourth resistor (R$_4$) 522 has a resistance value of 4R.

The second switch (SW$_2$) 524, the third switch (SW$_3$) 526, and the fourth switch (SW$_4$) 528 control the current steering through the respective resistor paths based on the boost selection signals. In embodiments, a logic high input closes the corresponding switch, allowing current to flow through the resistor path. A logic low input opens the switch, blocking current flow through that path. The binary-weighted resistor network 514 creates proportionally scaled voltage.

In various embodiments, the voltage at the common node between the binary-weighted resistor network 514, the source current 504, the second capacitor (C$_2$) 504, and the switch (SW$_1$) 516 varies based on the parallel combination of activated resistor paths. The total network resistance seen by the source current 504 changes according to the boost selection signals. This results in discrete voltage levels at the common node corresponding to the boost selection signals while maintaining constant total current flow from source current 504.

The current steering architecture enables precise current division through the binary-weighted paths. In an embodiment, when all switches are open, the voltage at the common node decreases to the minimum value. When switches are closed, the voltage at the common node rises according to Ohm's law based on the parallel resistance combination. The network creates accurate current scaling while providing stable voltage-to-current conversion across different boost selection signals.

In embodiments, the command signal (CMD) activates the first switch (SW$_1$) in coordination with switching of the write driver system 100. The boost current pulse precedes and overlaps with the main bridge current transition to reduce the overall transition time at the magnetic recording head 128.

The positive boost circuit 500 generates a current pulse in parallel with the main bridge current by applying a voltage pulse to the pre-biased base of the first PNP transistor (Q$_{PNP1}$) 502. When the command signal (CMD) activates the first switch (SW$_1$) 516, a bootstrap action occurs where the voltage at the base of the second PNP transistor (Q$_{PNP2}$) 510 rapidly changes. Due to the exponential current-voltage relationship of the PNP transistor, this small change in base-emitter voltage (V$_{BE}$) generates a large collector current that flows through the second PNP transistor (Q$_{PNP2}$) 510 to the first node (NODE) or the second node (NODE$_2$).

Following activation, the first resistor (R$_1$) 508 provides a path for the base voltage of the first PNP transistor (Q$_{PNP1}$) 502 to return to its initial pre-bias value within tens of picoseconds, effectively terminating the boost effect. The self-timing mechanism creates a precisely controlled current (e.g., 40 milliamps (mA)) for 70 picoseconds, while the main bridge current transitions occur over 180 picoseconds.

After the brief pulse duration, the first resistor (R$_1$) 508 returns the base voltage of the first PNP transistor (Q$_{PNP1}$) 502 to its pre-bias level, effectively terminating the boost current. The binary-weighted resistor network 514 allows precise control over the boost current magnitude by enabling different combinations of capacitors through the boost selection signals, providing eight discrete levels of boost current adjustment.

The magnitude of the boost current can be set to eight different discrete levels through the binary-weighted resistor network 514. Different parallel resistance combinations are created by reconfiguring the three binary-weighted resistors through their corresponding switches. Each combination provides a specific voltage level at the base of the second PNP transistor (Q$_{PNP2}$) 510, resulting in proportionally scaled boost currents while maintaining the same pulse duration characteristics.

It should be appreciated that the binary-weighted resistor network 514 with three resistors represents one example of achieving multiple levels of boost current adjustment. In various embodiments, the binary-weighted resistor network 514 may include fewer or additional resistors with corresponding switches to provide different numbers of discrete boost current levels. For example, the network may be expanded to include additional binary-weighted resistors to provide finer granularity in boosting current control or may be implemented with non-binary weightings or different resistance ratios depending on specific application requirements. The principles of operation remain applicable regardless of the particular number or configuration of resistors employed in the network.

Advantageously, the configuration of the positive boost circuit 500, with pre-biased PNP transistors and capacitive coupling, enables the generation of very short-duration current pulses without requiring complex timing circuits. The exponential current gain characteristic of the bipolar transistors allows the positive boost circuit 500 to generate substantial current pulses from small input voltage changes while maintaining controlled pulse durations.

The fifth resistor ($R_5$) 523 provides a well-defined voltage on the common node connected to the source current 504 when all the switches are in the OFF state. Without the fifth resistor ($R_5$) 523, if all the switches in the binary-weighted resistor network are OFF, the common node would be left floating, resulting in an undefined voltage. This undefined voltage could lead to unpredictable behavior or instability in the circuit. A default resistance path is established between the common node and ground by incorporating the fifth resistor ($R_5$) 523 in parallel with the binary-weighted resistor network. This ensures that even when all the switches are OFF, the voltage on the common node is pulled down to a known level, typically close to ground potential.

Accordingly, the fifth resistor ($R_5$) 523 helps maintain a stable and predictable voltage on the common node, preventing floating or undefined conditions. This enhances the reliability and performance of the circuit, especially when the binary-weighted resistor network is used for precise control or measurement applications. The value of the fifth resistor ($R_5$) 523 can be chosen to provide an appropriate default resistance without significantly affecting the overall resistance of the binary-weighted resistor network when the switches are in the ON state.

Figure 6:
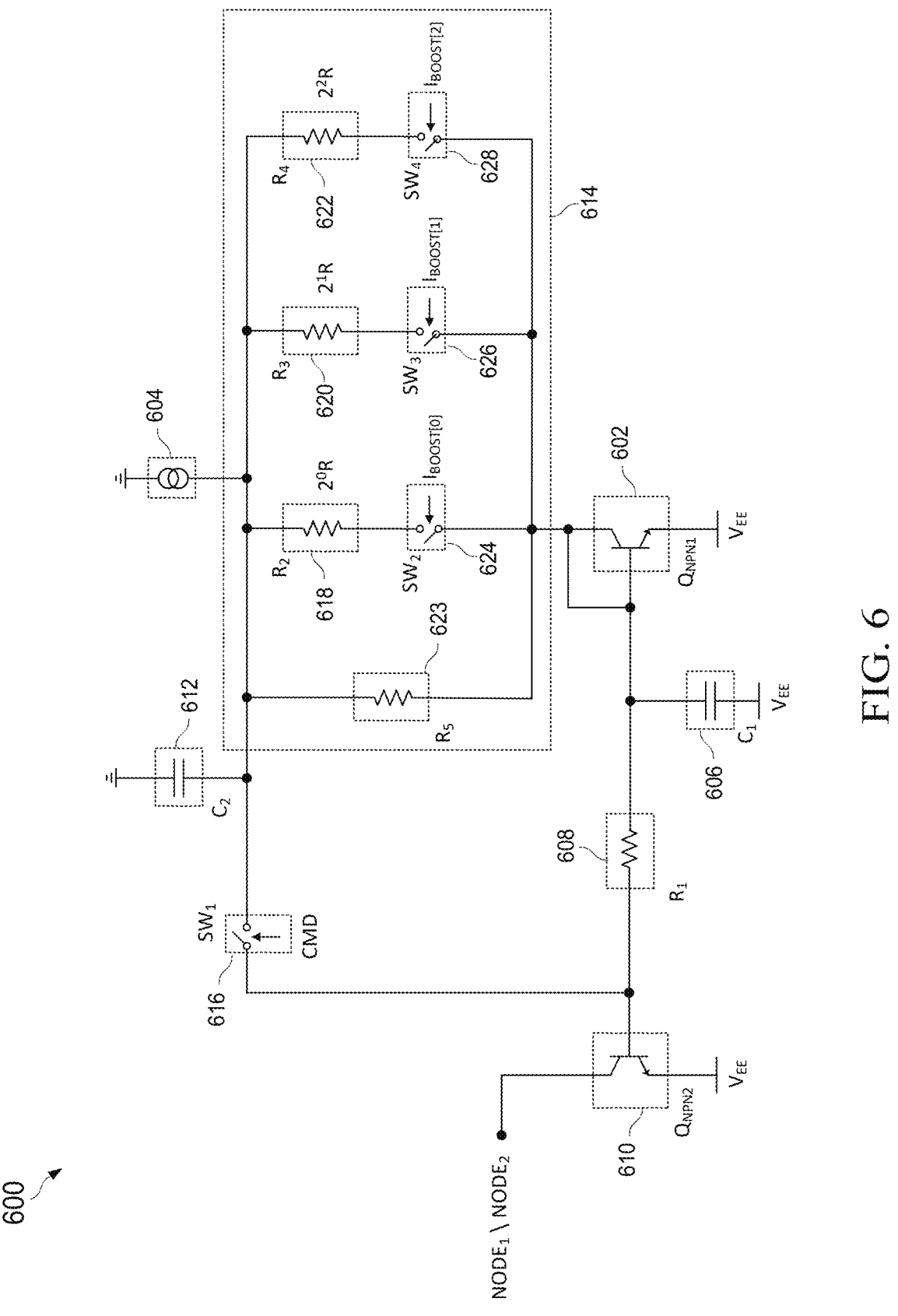
FIG. 6 is a schematic of an embodiment negative boost circuit.

FIG. 6 illustrates a schematic of an embodiment negative boost circuit 600, which can be coupled to the first node ($NODE_1$) or the second node ($NODE_2$) of the write driver system 100. The negative boost circuit 600 includes a first NPN transistor ($Q_{NPN1}$) 602, a source current 604, a first capacitor ($C_1$) 606, a first resistor ($R_1$) 608, a second NPN transistor ($Q_{NPN2}$) 610, a second capacitor ($C_2$) 612, a binary-weighted resistor network 614, a fifth resistor ($R_5$) 523, and a first switch ($SW_1$) 616, which may (or may not) be arranged as shown. The negative boost circuit 600 may include additional components not shown.

To reduce transition times, the negative boost circuit 600 generates current pulses in parallel with the bridge circuit current ($I_{OUT}$). The first NPN transistor ($Q_{NPN1}$) 602 receives a pre-bias voltage through the source current 604 and set by the binary-weighted resistor network 614, while the second NPN transistor ($Q_{NPN2}$) 610 couples to the first node ($NODE_1$) and the second node ($NODE_2$). The first resistor ($R_1$) 608 couples between the first NPN transistor ($Q_{NPN1}$) 602 and the second NPN transistor ($Q_{NPN2}$) 610, providing a path for the NPN base voltage to return to its initial value after activation. The first capacitor ($C_1$) 606 couples to the first NPN transistor ($Q_{NPN1}$) 602 to maintain the stability of the base voltage of the first NPN transistor ($Q_{NPN1}$) 602.

In embodiments, the binary-weighted resistor network 614 includes a second resistor ($R_2$) 618, a third resistor ($R_3$) 620, a fourth resistor ($R_4$) 622, a second switch ($SW_2$) 624, and a third switch ($SW_3$) 626, and a fourth switch ($SW_4$) 628. The resistors are arranged in parallel, each in series with a corresponding switch. Each switch is coupled to a boost selection signal (i.e., $I_{BOOST[0]}$, $I_{BOOST[1]}$, $_{BOOST[2]}$). The source current 604 is coupled to the binary-weighted resistor network 614 to distribute current through the parallel resistor paths.

In embodiments, the source current 604 generates a stable reference current ($I_{REF}$) that flows through the active resistor paths based on the boost selection signals. The resistors of the binary-weighted resistor network 614 follow a binary-weighted progression where each subsequent resistor value doubles from the previous one. In an embodiment, the second resistor ($R_2$) 618 has a resistance value of R, the third resistor ($R_3$) 620 has a resistance value of 2R, and the fourth resistor ($R_4$) 622 has a resistance value of 4R.

The second switch ($SW_2$) 624, the third switch ($SW_3$) 626, and the fourth switch ($SW_4$) 628 control the current steering through the respective resistor paths based on the boost selection signals. In embodiments, a logic high input closes the corresponding switch, allowing current to flow through the resistor path. A logic low input opens the switch, blocking current flow through that path. The binary-weighted resistor network 614 creates proportionally scaled voltage.

In various embodiments, the voltage at the common node between the binary-weighted resistor network 614, the source current 604, the second capacitor ($C_2$) 612, and the first switch ($SW_1$) 616 varies based on the parallel combination of activated resistor paths. The total network resistance seen by the source current 604 changes according to the boost selection signals. This results in discrete voltage levels at the common node corresponding to the boost selection signals while maintaining constant total current flow from source current 604.

The current steering architecture enables precise current division through the binary-weighted paths. In an embodiment, when all switches are open, the voltage at the common node rises to the maximum value. When switches are closed, the voltage at the common node drops according to Ohm's law based on the parallel resistance combination. The network creates accurate current scaling while providing stable voltage-to-current conversion across different boost selection signals.

In embodiments, the command signal (CMD) activates the first switch ($SW_1$) in coordination with switching of the write driver system 100. The boost current pulse precedes and overlaps with the main bridge current transition to reduce the overall transition time at the magnetic recording head 128.

The negative boost circuit 600 generates a current pulse in parallel with the main bridge current by applying a voltage pulse to the pre-biased base of the first NPN transistor ($Q_{NPN1}$) 602. When the command signal (CMD) activates the first switch ($SW_1$) 616, a bootstrap action occurs where the voltage at the base of the first NPN transistor ($Q_{NPN1}$) 602 rapidly changes. Due to the exponential current-voltage relationship of the NPN transistor, this small change in base-emitter voltage ($V_{BE}$) generates a large collector current that flows through the second NPN transistor ($Q_{NPN2}$) 610 to the first node ($NODE_1$) or the second node ($NODE_2$).

Following activation, the first resistor ($R_1$) 608 provides a path for the base voltage of the first NPN transistor ($Q_{NPN1}$) 602 to return to its initial pre-bias value within tens of picoseconds, effectively terminating the boost effect. The self-timing mechanism creates a precisely controlled current (e.g., 40 milliamps (mA)) for 70 picoseconds, while the main bridge current transitions occur over 180 picoseconds.

After the brief pulse duration, the first resistor ($R_1$) 608 returns the base voltage of the first NPN transistor ($Q_{NPN1}$) 602 to its pre-bias level, effectively terminating the boost current. The binary-weighted resistor network 614 allows precise control over the boost current magnitude by enabling different combinations of capacitors through the boost selection signals, providing eight discrete levels of boost current adjustment.

The magnitude of the boost current can be set to eight different discrete levels through the binary-weighted resistor network 614. Different parallel resistance combinations are created by reconfiguring the three binary-weighted resistors through their corresponding switches. Each combination provides a specific voltage level at the base of the first NPN transistor ($Q_{NPN1}$) 602, resulting in proportionally scaled boost currents while maintaining the same pulse duration characteristics.

It should be appreciated that the binary-weighted resistor network 614 with three resistors represents one example of achieving multiple levels of boost current adjustment. In various embodiments, the binary-weighted resistor network 614 may include fewer or additional resistors with corresponding switches to provide different numbers of discrete boost current levels. For example, the network may be expanded to include additional binary-weighted resistors to provide finer granularity in boosting current control or may be implemented with non-binary weightings or different resistance ratios depending on specific application requirements. The principles of operation remain applicable regardless of the particular number or configuration of resistors employed in the network.

Advantageously, the configuration of the negative boost circuit 600, with pre-biased NPN transistors and capacitive coupling, enables the generation of very short-duration current pulses without requiring complex timing circuits. The exponential current gain characteristic of the bipolar transistors allows the negative boost circuit 600 to generate substantial current pulses from small input voltage changes while maintaining controlled pulse durations.

The fifth resistor ($R_5$) 623 provides a well-defined voltage on the common node connected to the source current 604 when all the switches are in the OFF state. Without the fifth resistor ($R_5$) 623, if all the switches in the binary-weighted resistor network are OFF, the common node would be left floating, resulting in an undefined voltage. This undefined voltage could lead to unpredictable behavior or instability in the circuit. A default resistance path is established between the common node and ground by incorporating the fifth resistor ($R_5$) 623 in parallel with the binary-weighted resistor network. This ensures that even when all the switches are OFF, the voltage on the common node is pulled down to a known level, typically close to ground potential.

Accordingly, the fifth resistor ($R_5$) 623 helps maintain a stable and predictable voltage on the common node, preventing floating or undefined conditions. This enhances the reliability and performance of the circuit, especially when the binary-weighted resistor network is used for precise control or measurement applications. The value of the fifth resistor ($R_5$) 623 can be chosen to provide an appropriate default resistance without significantly affecting the overall resistance of the binary-weighted resistor network when the switches are in the ON state.

Figure 7:
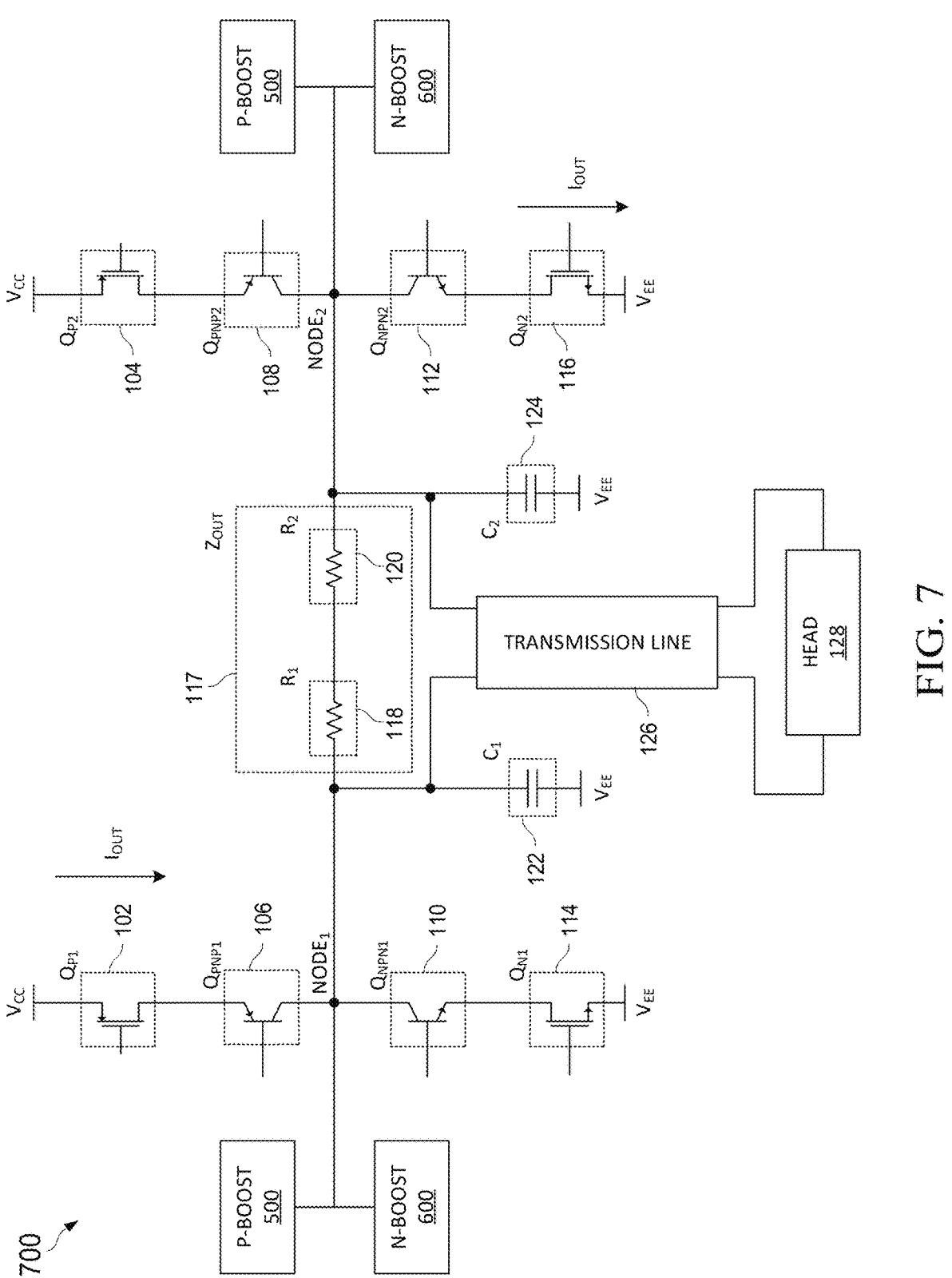
FIG. 7 is a schematic of an embodiment write driver system.

FIG. 7 illustrates a schematic of an embodiment write driver system 700 that combines the write driver system 100 with boost circuits for reducing current transition times. The write driver system 700 includes the full bridge configuration of the write driver system 100 with positive boost circuits 500 and negative boost circuits 600 coupled to the first node ($NODE_1$) or the second node ($NODE_2$) for enhancing current switching performance.

In the first branch, a first positive boost circuit 500 couples to the first node ($NODE_1$) between the first PNP transistor ($Q_{PNP1}$) 106 and the first NPN transistor ($Q_{NPN1}$) 110, while a first negative boost circuit 600 couples to the same node. Similarly, in the second branch, a second positive boost circuit 500 couples to the second node ($NODE_2$) between the second PNP transistor ($Q_{PNP2}$) 108 and the second NPN transistor ($Q_{NPN2}$) 112, with a second negative boost circuit 600 also coupled to the second node ($NODE_2$).

The boost circuits operate in diagonal pairs during bridge switching transitions. When the first branch conducts current from top to bottom, the first positive boost circuit 500 and the second negative boost circuit 600 activate simultaneously to provide additional current pulses that accelerate the transition. Conversely, when current flows through the opposite diagonal, the second positive boost circuit 500 and the first negative boost circuit 600 activate to enhance that transition.

Each boost circuit generates precisely controlled current pulses that combine with the main bridge current to reduce transition times at the magnetic recording head 128. The boost circuits maintain the impedance-matching characteristics of the system while providing programmable boost current levels through their respective binary-weighted resistor networks. This configuration enables faster write current transitions while preserving signal integrity through the transmission line 126 to the magnetic recording head 128.

In operation, the boost circuits generate current pulses (e.g., approximately 40 mA) for durations of 70 picoseconds, while the main bridge current transitions can occur over 180-200 picoseconds. The boost current pulses from the positive boost circuits 500 and negative boost circuits 600 are coordinated to precede and overlap with the main bridge current transitions, effectively reducing the overall transition time from, for example, approximately 90 picoseconds to 65 picoseconds at the magnetic recording head 128.

The complementary arrangement of positive boost circuits 500 and negative boost circuits 600 at each node provides balanced current enhancement during transitions. The configuration, combined with the programmable nature of the boost circuits, allows optimization of the boost currents based on specific application requirements without requiring modifications to the main bridge circuit or impedance matching elements. The parasitic capacitance contribution from the boost circuits remains negligible compared to the existing parasitic capacitances, thereby maintaining the intended impedance-matching characteristics of the system.

Figure 8:
FIG. 8 is a block diagram of a pre-amplifier placed on the disk drive head stack assembly of a hard disk drive.
Figure 8:
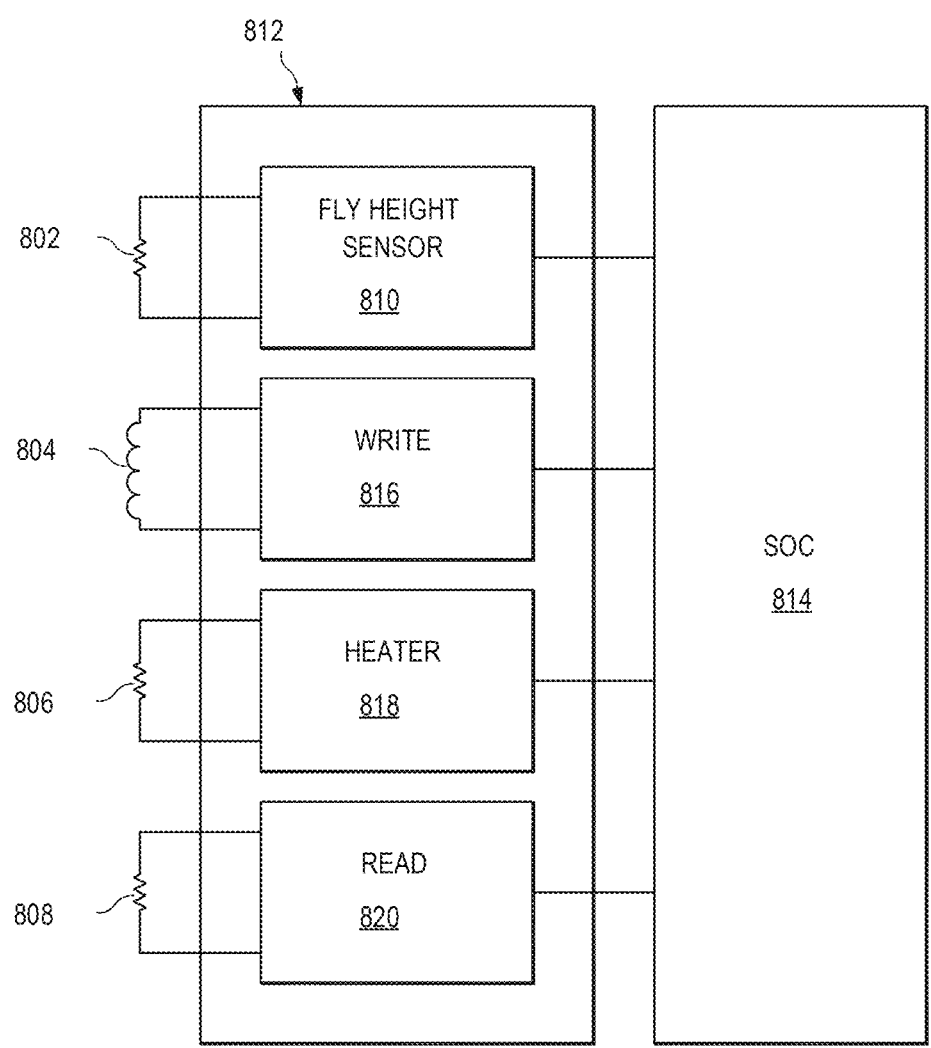

FIG. 8 illustrates a block diagram of a pre-amplifier 812 placed on the disk drive head stack assembly of a hard disk drive 800. In embodiments, the write driver system 400 or the write driver system 700 is implemented as the write circuit 816 of the pre-amplifier 812.

The disk drive head stack assembly slides over the disk. The pre-amplifier 812 includes a fly height sensor 810. In embodiments, the fly height sensor 810 includes a biasing circuit and an amplifier (not shown). The fly height sensor 810 is coupled to a resistive sensor 802. The resistive sensor 802 monitors the fly height between the disk drive head and the disk itself.

A writer coil 804 is coupled to the write circuit 816 (for writing to the disk), a heater resistor 806 is coupled to the heater circuit 818 (for controlling the fly height spacing), and a magnetic resistor 808 is coupled to the read circuit 820 (for reading from the disk). The fly height sensor 810, write circuit 816, heater circuit 818, and read circuit 820 are coupled to a silicon-on-chip (SoC) 814 for processing. In embodiments, the SoC 814 provides the command signals, the boost selection signals, and other signals to operate the main bridge circuit.

A first aspect relates to a circuit, comprising a first transistor having a pre-biased base terminal; a second transistor; a first capacitor coupled to the first transistor; a binary-weighted capacitor network comprising a plurality of selectively activated capacitors; a plurality of logic gates coupled to the binary-weighted capacitor network, wherein each logic gate is configured to receive a command signal and a corresponding boost selection signal; and a first resistor coupled between the first transistor and the second transistor, wherein the first resistor provides a voltage restoration path.

In a first implementation form of the circuit, according to the first aspect as such, each of the first transistor and the second transistor is a PNP transistor forming a positive boost circuit.

In a second implementation form of the circuit, according to the first aspect as such or any preceding implementation form of the first aspect, the binary-weighted capacitor network includes a second capacitor having a first capacitance value; a third capacitor having twice the first capacitance value; and a fourth capacitor having four times the first capacitance value.

In a third implementation form of the circuit, according to the first aspect as such or any preceding implementation form of the first aspect, the plurality of logic gates includes three NAND gates or AND gates, each NAND gate or AND gate receiving the command signal and a respective one of three boost selection signals.

In a fourth implementation form of the circuit, according to the first aspect as such or any preceding implementation form of the first aspect, each of the first transistor and the second transistor is an NPN transistor forming a negative boost circuit.

In a fifth implementation form of the circuit, according to the first aspect as such or any preceding implementation form of the first aspect, the circuit further comprising a current source coupled to the first transistor configured to provide a pre-bias voltage at a base terminal of the first transistor.

In a sixth implementation form of the circuit, according to the first aspect as such or any preceding implementation form of the first aspect, activation of the binary-weighted capacitor network generates a voltage pulse at a base terminal of the second transistor, and wherein the voltage restoration path returns the base terminal to its pre-bias voltage following the voltage pulse.

A second aspect relates to a circuit, comprising a first transistor having a pre-biased base terminal; a second transistor; a binary-weighted resistor network comprising a plurality of parallel resistor paths; a plurality of switches, each switch coupled in series with a corresponding resistor path and configured to receive a boost selection signal; a first switch coupled to receive a command signal; and a first resistor coupled between the first transistor and the second transistor, wherein the first resistor provides a voltage restoration path.

In a first implementation form of the circuit, according to the second aspect as such, each of the first transistor and the second transistor is a PNP transistor forming a positive boost circuit.

In a second implementation form of the circuit, according to the second aspect as such or any preceding implementation form of the second aspect, the binary-weighted resistor network includes a second resistor having a first resistance value; a third resistor having a second resistance value twice the first resistance value; and a fourth resistor having a third resistance value four times the first resistance value.

In a third implementation form of the circuit, according to the second aspect as such or any preceding implementation form of the second aspect, each of the first transistor and the second transistor is an NPN transistor forming a negative boost circuit.

In a fourth implementation form of the circuit, according to the second aspect as such or any preceding implementation form of the second aspect, the circuit further comprising a current source coupled to the binary-weighted resistor network; and a first capacitor coupled to the first transistor.

In a fifth implementation form of the circuit, according to the second aspect as such or any preceding implementation form of the second aspect, the parallel resistor paths create proportionally scaled currents based on switches activated by boost selection signals.

In a sixth implementation form of the circuit, according to the second aspect as such or any preceding implementation form of the second aspect, activation of the first switch creates a bootstrap action that changes a voltage at a base terminal of the second transistor, and wherein the voltage restoration path returns the base terminal to its pre-bias voltage.

A third aspect relates to a write driver system, comprising a bridge circuit including first and second branches, each branch having upper and lower sides; a first positive boost circuit coupled in parallel with the upper side of the first branch; a first negative boost circuit coupled in parallel with the lower side of the second branch; a second negative boost circuit coupled in parallel with the lower side of the first branch; a second positive boost circuit coupled in parallel with the upper side of the second branch; and a control circuit configured to activate diagonal pairs of boost circuits during switching transitions of the bridge circuit.

In a first implementation form of the write driver system, according to the third aspect as such, each boost circuit comprises a transistor circuit having a pre-biased transistor; a binary-weighted capacitor network including selectively activated capacitors; and a resistor providing a voltage restoration path.

In a second implementation form of the write driver system, according to the third aspect as such or any preceding implementation form of the third aspect, each boost circuit comprises a transistor circuit having a pre-biased transistor; a binary-weighted resistor network including parallel resistor paths with corresponding switches; and a resistor providing a voltage restoration path.

In a third implementation form of the write driver system, according to the third aspect as such or any preceding implementation form of the third aspect, during a first phase, the control circuit is configured to simultaneously activate the first positive boost circuit and the first negative boost circuit, and during a second phase, the control circuit is configured to simultaneously activate the second negative boost circuit and the second positive boost circuit.

In a fourth implementation form of the write driver system, according to the third aspect as such or any preceding implementation form of the third aspect, each boost circuit generates current pulses lasting approximately 70 picoseconds and the bridge circuit current transitions occur over 180-200 picoseconds.

In a second implementation form of the write driver system, according to the third aspect as such or any preceding implementation form of the third aspect, the write driver system further comprising an impedance matching network coupled between the bridge circuit and a transmission line; and a magnetic recording head coupled to the transmission line, wherein the boost circuits reduce current transition times at the magnetic recording head while maintaining impedance matching characteristics.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A write driver system, comprising:
a bridge circuit including first and second branches, each branch having upper and lower sides;
a first positive boost circuit coupled in parallel with the upper side of the first branch;
a first negative boost circuit coupled in parallel with the lower side of the second branch;
a second negative boost circuit coupled in parallel with the lower side of the first branch;
a second positive boost circuit coupled in parallel with the upper side of the second branch; and
a control circuit configured to activate diagonal pairs of boost circuits during switching transitions of the bridge circuit.

2. The write driver system of claim 1, wherein each boost circuit comprises:
a transistor circuit having a pre-biased transistor;
a binary-weighted capacitor network including selectively activated capacitors; and
a resistor providing a voltage restoration path.

3. The write driver system of claim 1, wherein each boost circuit comprises:
a transistor circuit having a pre-biased transistor;
a binary-weighted resistor network including parallel resistor paths with corresponding switches; and
a resistor providing a voltage restoration path.

4. The write driver system of claim 1, wherein during a first phase, the control circuit is configured to simultaneously activate the first positive boost circuit and the first negative boost circuit, and during a second phase, the control circuit is configured to simultaneously activate the second negative boost circuit and the second positive boost circuit.

5. The write driver system of claim 1, wherein each boost circuit generates current pulses lasting approximately 70 picoseconds, and wherein the bridge circuit current transitions occur over 180-200 picoseconds.

6. The write driver system of claim 1, further comprising:
an impedance matching network coupled between the bridge circuit and a transmission line; and
a magnetic recording head coupled to the transmission line, wherein the boost circuits reduce current transition times at the magnetic recording head while maintaining impedance matching characteristics.

7. A magnetic recording write driver system, comprising:
a bridge circuit configured to provide bidirectional write currents to a magnetic recording head, the bridge circuit including a first branch and a second branch, each branch having an upper transistor and a lower transistor;
a plurality of current boost circuits, each current boost circuit including a pre-biased transistor configured to generate current pulses having durations shorter than bridge circuit current transitions;
a transmission line coupled to the bridge circuit; and
a magnetic recording head coupled to the transmission line, wherein the current boost circuits reduce current transition times at the magnetic recording head during data writing operations.

8. The magnetic recording write driver system of claim 7, wherein the plurality of current boost circuits comprises:
a first positive boost circuit coupled to the upper transistor of the first branch;
a first negative boost circuit coupled to the lower transistor of the second branch;
a second negative boost circuit coupled to the lower transistor of the first branch; and
a second positive boost circuit coupled to the upper transistor of the second branch.

9. The magnetic recording write driver system of claim 8, wherein the current boost circuits are configured to activate in diagonal pairs, with the first positive boost circuit and the first negative boost circuit activating simultaneously during a first switching phase, and the second positive boost circuit and the second negative boost circuit activating simultaneously during a second switching phase.

10. The magnetic recording write driver system of claim 7, wherein each current boost circuit includes a selectable boost current network configured to provide multiple discrete levels of boost current magnitude.

11. The magnetic recording write driver system of claim 10, wherein the selectable boost current network comprises a binary-weighted network providing multiple discrete boost current levels.

12. The magnetic recording write driver system of claim 7, wherein the current pulses have durations of approximately 70 picoseconds or less, and wherein the bridge circuit current transitions occur over 180 picoseconds or greater.

13. The magnetic recording write driver system of claim 7, further comprising an impedance matching network coupled between the bridge circuit and the transmission line, wherein the current boost circuits maintain impedance matching characteristics while reducing current transition times.

14. A hard disk drive write driver system, comprising:
a bridge circuit including a first branch and a second branch configured to generate bidirectional write currents, each branch including complementary bipolar transistors;
a first set of boost circuits coupled to the first branch, including a positive boost circuit and a negative boost circuit;

a second set of boost circuits coupled to the second branch, including a positive boost circuit and a negative boost circuit;

a control circuit configured to coordinate activation of the boost circuits with switching transitions of the bridge circuit;

an impedance matching network; and a magnetic recording head coupled through a transmission line, wherein the boost circuits accelerate current transitions at the magnetic recording head for high-speed data writing.

15. The hard disk drive write driver system of claim 14, wherein each boost circuit comprises:

a first bipolar transistor having a pre-biased base terminal;

a second bipolar transistor coupled to a respective branch of the bridge circuit;

a programmable network configured to generate selectable boost current levels; and a voltage restoration circuit coupled between the first and second bipolar transistors.

16. The hard disk drive write driver system of claim 15, wherein the programmable network comprises:

a binary-weighted capacitor network with logic gates; or a binary-weighted resistor network with switches.

17. The hard disk drive write driver system of claim 14, wherein the control circuit is configured to activate boost circuits in diagonal pairs across the bridge circuit, with a positive boost circuit from one branch activating simultaneously with a negative boost circuit from the other branch.

18. The hard disk drive write driver system of claim 14, wherein the boost circuits generate current pulses that precede and overlap with bridge current transitions.

19. The hard disk drive write driver system of claim 14, wherein the impedance matching network maintains broadband impedance matching from DC to several gigahertz.

20. The hard disk drive write driver system of claim 14, wherein the magnetic recording head is configured to write data onto a magnetic storage medium by generating alternating magnetic fields corresponding to bidirectional write currents, and wherein the boost circuits enable higher data rates through reduced current transition times.

* * * * *